(12) United States Patent
Lu et al.

(10) Patent No.: US 9,459,612 B2
(45) Date of Patent: Oct. 4, 2016

(54) MOVABLE DEVICE ALLOWING INSTANTANEOUS CORRECTION OF ERROR IN MOVING STATE AND ERROR CORRECTION METHOD THEREOF

(75) Inventors: Yung-Kui Lu, Pingjhen (TW); Kee-Tai Tsai, Taipei (TW)

(73) Assignee: Yung-Kui Lu, Pingjhen, Taoyuan County (TW)

( * ) Notice: Subject to any disclaimer, the term of this patent is extended or adjusted under 35 U.S.C. 154(b) by 643 days.

(21) Appl. No.: 13/596,391

(22) Filed: Aug. 28, 2012

(65) Prior Publication Data

US 2014/0067090 A1 Mar. 6, 2014

(51) Int. Cl.
*G05B 9/00* (2006.01)
*G05B 19/401* (2006.01)

(52) U.S. Cl.
CPC . *G05B 19/4015* (2013.01); *G05B 2219/50042* (2013.01)

(58) Field of Classification Search
CPC ........................................ G05B 9/00
USPC ................................... 700/79, 160
See application file for complete search history.

(56) References Cited

U.S. PATENT DOCUMENTS 4,428,055 A * 1/1984 Zurbrick et al. .............. 700/160

* cited by examiner

*Primary Examiner* — Tejal Gami
(74) *Attorney, Agent, or Firm* — Maschoff Brennan

(57) ABSTRACT

Disclosed are a movable device allowing instantaneous correction of error in a moving state and an error correction method thereof. The movable device includes a drive unit that is previously set up with an allowable error and has a moving path along which detection units are installed in a line. Precise measurements are taken in advance to obtain position data of each of the detection units. Comparison is then made by the controller between instantaneous data and corresponding comparison data. When the controller determines the instantaneous data exceed the comparison data, an instantaneous correction operation is made to make the instantaneous data not exceeding the comparison data. Acceleration or deceleration may be made by the drive unit to effect such a control that when the movable piece reaches the next detection unit, the instantaneous data do not exceed the comparison data.

9 Claims, 5 Drawing Sheets

MOVABLE DEVICE ALLOWING INSTANTANEOUS CORRECTION OF ERROR IN MOVING STATE AND ERROR CORRECTION METHOD THEREOF

FIELD OF THE INVENTION

The present invention relates to a movable device allowing correction of error and an error correction method thereof, and in particular to a movable device allowing instantaneous correction of error in moving situation and an error correction method thereof.

BACKGROUND OF THE INVENTION

For a conventional movable device, an error occurs after moving through a given distance in either linear movement or nonlinear movement, because of environmental factors (such as variation of distance caused by thermal expansion), human factors (such as poor quality control in production process and variation existing between movable devices of different production batches or different manufacturers), and other factors. The longer the distance that a movement takes is, the accumulation of error will be greater, making it not suitable for precision machining operations. Consequently, the moving distance shown on a controller for a movement taken by the movable device is different from a true distance detected through precision measurement (such as an optic scale) simply due to such errors. Today, robots (or manipulators) have been used to replace manual operation in order to cut down cost and eliminate errors and thus improving manufacturing efficiency. The preciseness of such devices must be set in a severer standard.

As to reduction or error, the conventional ways are periodic inspections (such as daily inspection, monthly inspection, or season inspection) and calibrations. These ways do not allow instantaneous correction. Once an inspection of a finished product indicates that the allowable error tolerance is exceeded, repair of rework must be performed. This increases the manufacture cost, not to mention that such a product may be totally scrapped due to repair being impossible. In addition, the process of shutting down system for calibration is simply wastes of labor and time and affects the production.

Thus, the present invention aims to provide a movable device that allows instantaneous correction of error in a moving situation in order to prevent accumulation of error, so that the error can be controlled within an allowable range regardless how long the moving distance is.

SUMMARY OF THE INVENTION

The first object of the present invention is to provide an error correction method allowing instantaneous correction of error in moving situation, wherein the movable device comprises a drive unit that is previously set up with a drive unit allowable error and has a moving path along which a plurality of detection units is installed. Precise measurements of actual position are made of each of the detection units so as to provide position data. Comparison of instantaneous position data with the comparison data is then made by a controller, so that when it is determined that the instantaneous position data exceed the comparison data, an instantaneous correction operation is taken to make the instantaneous position data not exceeding the comparison data. Acceleration or deceleration may be made by the drive unit to effect such a control that when the moving object reaches the next detection unit, the instantaneous position data do not the comparison data so as to prevent accumulation of errors from exceeding the allowable range. As such, even though a moving distance is increased, the error can be well controlled within the allowable range and the design flexibility for the length of the movable device is totally free of constraint in this respect.

The second object of the present invention is to provide a movable device allowing instantaneous correction of error in a moving situation, wherein a plurality of detection units is installed along a moving path of the movable device. The detection units and a drive unit that drives a moving object to move are both electrically connected (including electrical means and electromagnetic means) to a controller. The controller may make a comparison between the instantaneous position data and the corresponding comparison data. When it is determined that the instantaneous position data exceed the comparison data, a correction operation is taken to make the instantaneous position data not exceeding the comparison data so that an advantage that an instantaneous correction of error can be made in a moving situation to prevent accumulation of errors from exceeding the allowable range. As such, even though a moving distance is increased, the error can be well controlled within the allowable range and the design flexibility for the length of the movable device is totally free of constraint in this respect.

The third object of the present invention is to provide a movable device allowing instantaneous correction of error in a moving situation, wherein a drive unit is previously set up with a drive unit allowable error and a controller comprises actual positions of detection units installed along a moving path. The controller makes a computation operation based on the position data and the drive unit allowable error to obtain comparison data. The controller receives an instantaneous signal and generates instantaneous position data. The controller compares the instantaneous position data with the corresponding comparison data to determine if to make a correction, so that an advantage of preventing an instantaneously generated error from exceeding an allowable range can be achieved.

To achieve the above first object, the present invention provides an error correction method allowing instantaneous correction of error in a moving situation, which comprises: providing step, installation step, measurement step, instantaneous detection step, comparison step, and control by controller step, wherein providing step: providing a movable device comprising a base, a moving object, a drive unit, and a controller, the base comprising a moving path, the drive unit being previously set up with a drive unit allowable error; installation step: installing a plurality of detection units along the moving path of the movable device; measurement step: precisely measuring actual positions of the detection units on the moving path to obtain multiple sets of position data, the position data being supplied to the controller, so that the controller takes a computation operation based on the position data and the drive unit allowable error to obtain multiple sets of comparison data; instantaneous detection step: generating an instantaneous signal in instantaneously detecting the moving object moving from a previous detection unit to a next detection unit, the instantaneous signal being transmitted to the controller to generate instantaneous position data; comparison step: the controller comparing the instantaneous position data with the corresponding comparison data; and control by controller: allowing the moving object to continuously move forward without error correction when the controller determines the instantaneous position data do not exceed the comparison data;

and performing error correction when the controller determines the instantaneous position data exceed the comparison data. Thus, the instantaneous position data can be instantaneously corrected to not exceed the comparison data or acceleration or deceleration may be made by the drive unit to effect such a control that when the moving object reaches the next detection unit, the instantaneous position data do not exceed the comparison data.

As such, an advantage of instantaneously correcting errors in a moving situation to prevent accumulation of the errors from exceeding an allowable range is achieved. Even though a moving distance is increased, the errors can be well controlled within the allowable range. The design flexibility for the length of the movable device is totally free of constraint.

To achieve the second and third objects, the present invention provides a movable device allowing instantaneous correction of error in a moving situation, which comprises: a base, a drive unit, a moving object, a plurality of detection units, and a controller. The base comprises a moving path. The moving object is movably mounted on the moving path of the base. The drive unit drives the moving object to move along the moving path and is previously set up with a drive unit allowable error. The detection units are installed in a line along the moving path to detect the movement of the moving object along the moving path and generate an instantaneous signal. The controller is electrically connected to the drive unit and the detection units and comprises position data of the detection units on the moving path. The controller makes a computation operation based on the position data and the drive unit allowable error to obtain comparison data. The controller receives an instantaneous signal and generates instantaneous position data. The controller compares the instantaneous position data with the corresponding comparison data to determine if to make a correction.

As such, an advantage of instantaneously correcting errors in a moving situation to prevent accumulation of the errors from exceeding an allowable range is achieved. Even though a moving distance is increased, the errors can be well controlled within the allowable range. The design flexibility for the length of the movable device is totally free of constraint.

BRIEF DESCRIPTION OF THE DRAWINGS

The present invention will be apparent to those skilled in the art by reading the following description of preferred embodiments thereof with reference to the drawings, in which.

DETAILED DESCRIPTION OF THE PREFERRED EMBODIMENTS

Figure 1:
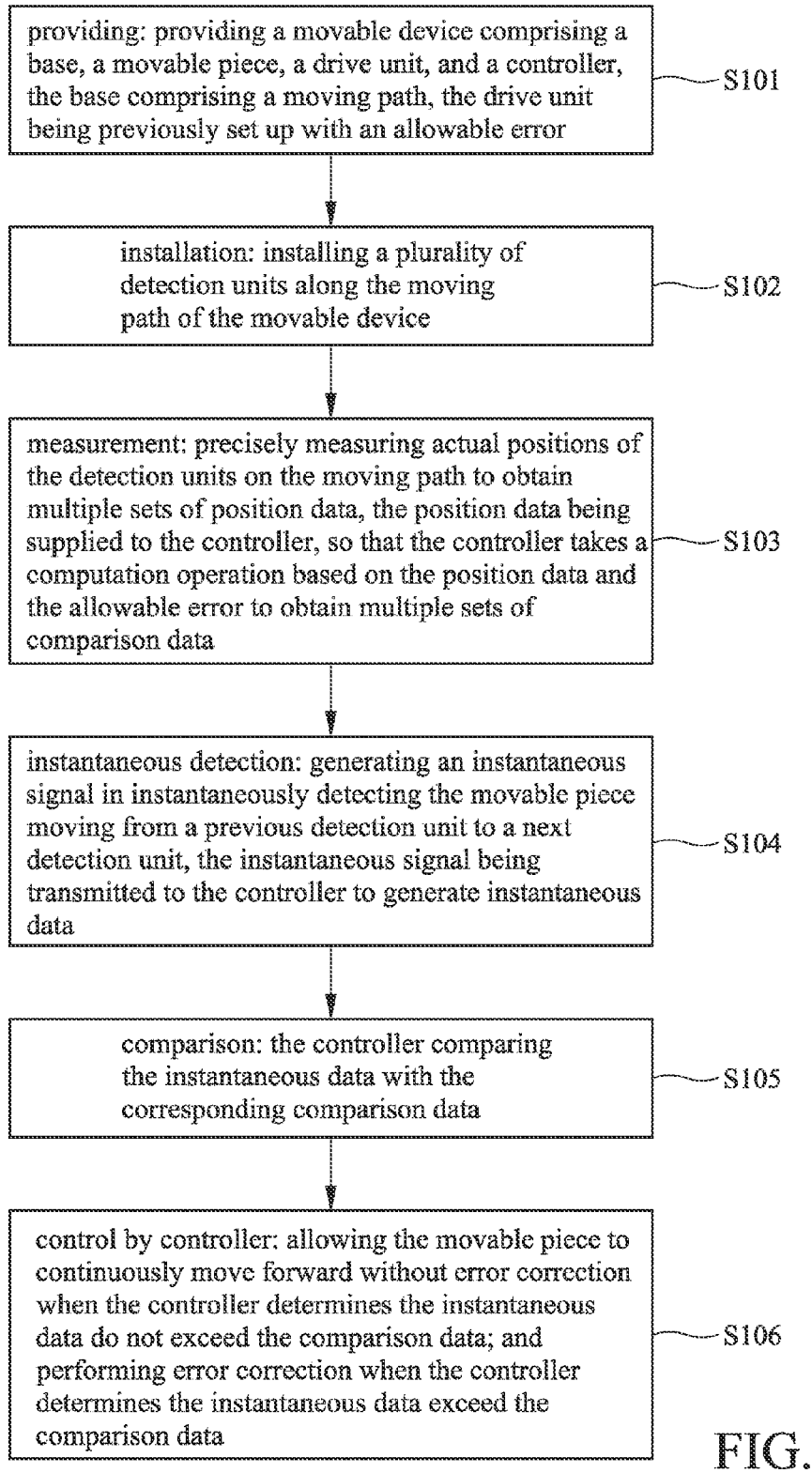
FIG. 1 is a flow chart illustrating an error correction method according to the present invention.
Figure 2:
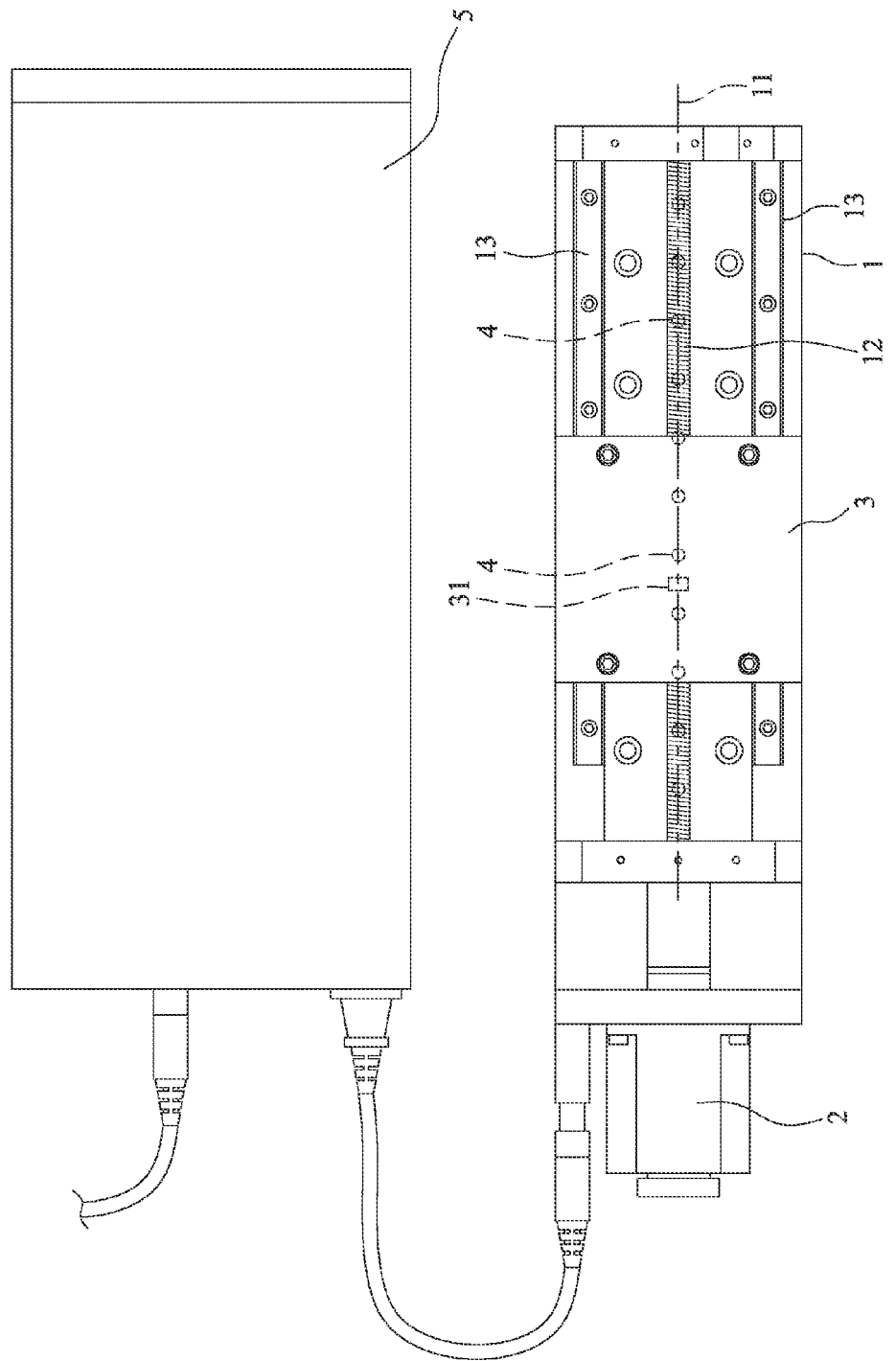
FIG. 2 is a top plan view of a movable device according to the present invention.
Figure 3:
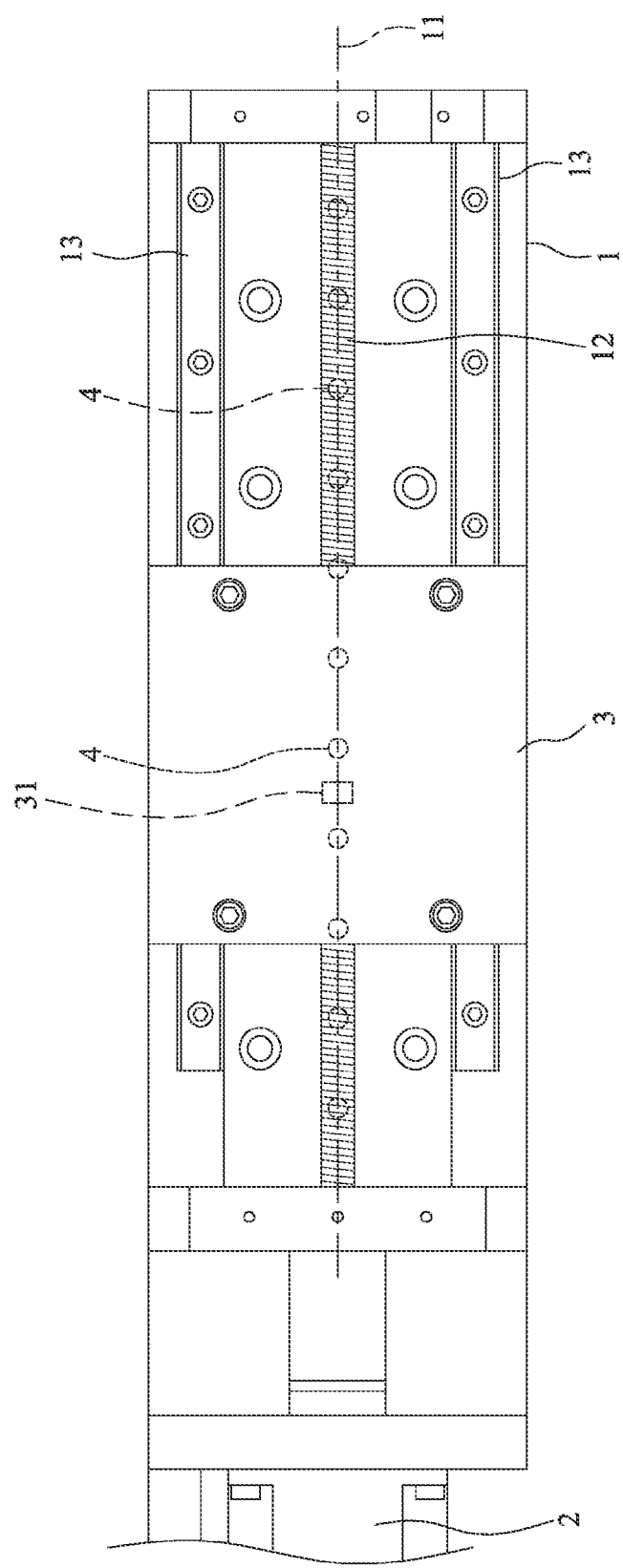
FIG. 3 is an enlarged view of a portion of FIG. 2.
Figure 4:
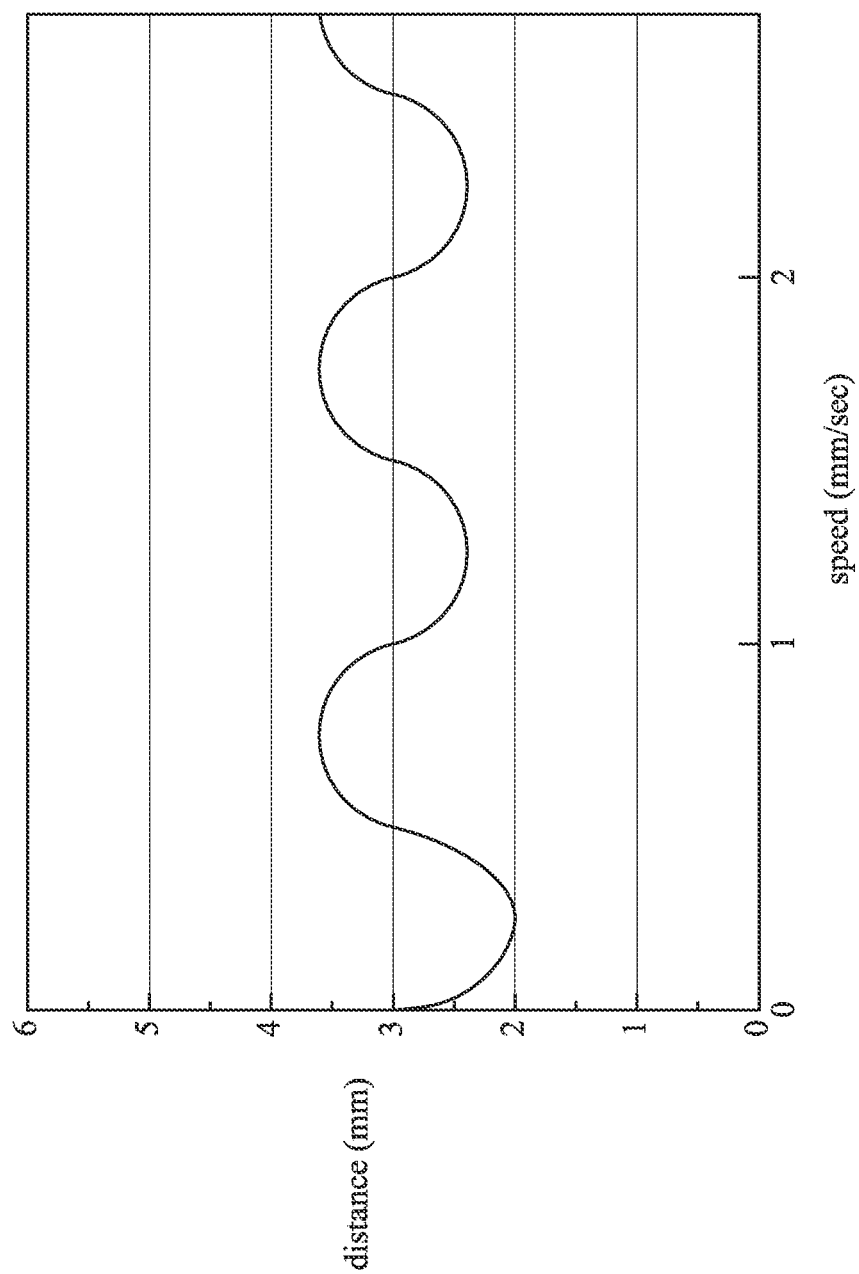
FIG. 4 is a plot of moving position of a conventional movable device.
Figure 5:
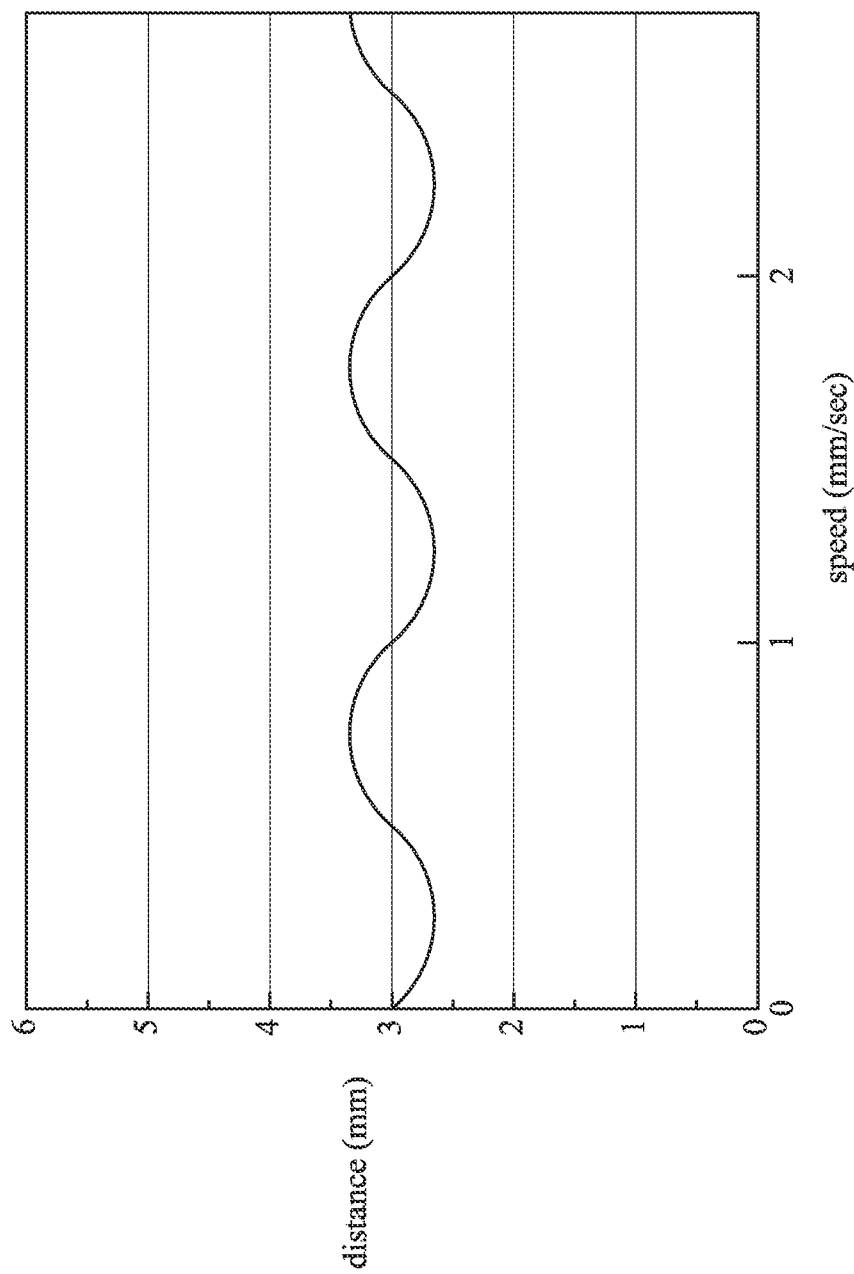
FIG. 5 is a plot of moving position of the movable device according to the present invention.

The present invention provides a movable device that allows instantaneous correction of error in a moving situation and an error correction method thereof. FIG. 1 shows a flow chart of the error correction method according to the present invention. FIGS. 2 and 3 are top plan views of the movable device according to the present invention. FIG. 4 is a plot of moving position of a conventional movable device. FIG. 5 is a plot of moving position of the movable device according to the present invention.

Referring to FIG. 1, the error correction method according to the present invention for correcting errors comprises the following steps: providing step S101, installation step S102, measurement step S103, instantaneous detection step S104, comparison step S105, and control step S106 of controller.

Providing step S101: a movable device comprising a base 1 (see illustration of FIGS. 2 and 3), a drive unit 2, a moving object 3, and a controller 5. The base 1 comprises a moving path 11 and the drive unit 2 is set up with a drive unit allowable error. In the instant embodiment, the movable device uses at least one screw 12 to drive the movement of the moving object 3 and the screw 12 is set up with the drive unit allowable error. For example, for a standard C7 grade screw, the range of error is ±50 μm for a travel of 300 mm. This is equivalent to an error range of ±2.5 μm for traveling 15 mm. With an assumption that the moving path 11 is 300 mm, the allowable error would be ±50 μm. However, the present invention is not limited to being driven via a screw 12 and any object that can be driven by the drive unit 2 to move the moving object 3 can be used.

Installation step S102: a plurality of detection units 4 is installed in line along the moving path 11 of the movable device.

Measurement step S103: precise measurements are made for actual positions of the detection units 4 along the moving path 11 to obtain multiple sets of position data. Each of the position data sets is provided to the controller 5, so that the controller 5 conducts a computation operation based on the position data and the drive unit allowable error (such as sing an internal processor of the controller 5 to carry out the computation operation, not illustrated) to obtain multiple sets of comparison data. In the instant embodiment, with a standard C7 grade screw being taken as an example, the drive unit allowable error for the moving object 3 to move a distance of 300 mm is ±50 μm and the detection units 4 are installed by constant interval of a spacing distance of 60 mm. Thus, for each of the detection unit 4, the allowable error is ±10 μm. To realize a control of not exceeding such an allowable error, the absolute value of the comparison data must be less than the absolute value of actual position±10 μm and actual position±9 μm in taken in the instant embodiment. The precision measurement is made with an optic scale.

Instantaneous detection step S104: an instantaneous signal is generated when an instant detection identifies the moving object 3 moving from a previous detection unit 4 (such as the Nth detection unit) to a next detection unit 4 (the N+1th detection unit) and the instantaneous signal is sent to the controller 5 to generate a set of instantaneous position data.

Comparison step S105: the controller 5 compares the instantaneous position data with the corresponding comparison data.

Control step of the controller 5: when the controller 5 determines the instantaneous position data does not exceed the comparison data, no correction is needed and the moving object 3 continues moving; when the controller 5 determines the instantaneous position data exceeds the comparison data, error correction is carried out. One way of error correction is that when the controller 5 determines the instantaneous position data exceeds the comparison data, an instantaneous correction is made of the instantaneous position data to not exceed the comparison data. Another way of error correction is that when the controller 5 determines the instantaneous position data exceeds the comparison data, acceleration or deceleration is made on the drive unit 2 in order to effect a control such that when the moving object 3 reaches the next detection unit 4, the instantaneous position data is made not exceeding the comparison data. In other words, with a plurality of detection units 4 being installed in line along the moving path 11 and each detection unit 4 being set up with position data that are obtained through precision measurement of the actual position thereof, once the instantaneous position data detected at each time when the moving object 3 passes the detection units 4 (generated with the instantaneous signal) is different from the comparison data, the controller 5 may instantaneously determines if a correction is needed, so that the error of the instantaneous position data possessed by the controller 5 is always controlled within an allowable range. Thus, no matter how long the distance that the moving object 3 travels is, instantaneous correction of errors in the moving situation can always be realized to prevent accumulation of the errors, provided the detection units 4 are arranged along the way to take detections. Thus, there is no need to shut down machine for calibration, the manufacturing efficiency can be effectively improved, and the manufacturing cost can be lowered down.

Referring to FIGS. 2 and 3, the present invention provides a movable device allowing instantaneous correction of error, which comprises: a base 1, a drive unit 2, a moving object 3, a plurality of detection units 4, and a controller 5.

The base 1 (which is made of a material of extremely low expansion coefficient so that errors caused by thermal expansion can be reduced) comprises a moving path 11. The moving object 3 is movably mounted on the moving path 11 of the base. The drive unit 2 drives the moving object 3 to move along the moving path 11 of the base and the drive unit is set up with a drive unit allowable error. In the instant embodiment, the drive unit 2 is mounted at one end of the base 1. The moving path 11 of the base 1 is provided with at least one screw 12, but not limited thereto (any object that is driven by the drive unit 2 to move the moving object 3 being considered within the scope of the present invention). The drive unit 2 drives the screw 12 to rotate and the moving object 3 is set in threading engagement with the screw 12 in a movable manner. The screw 12 has an axis that is parallel to the moving path 11. The screw 12 is set up with the drive unit allowable error. For example, for a standard C7 grade screw, the range of error is ±50 μm for a travel of 300 mm. This is equivalent to an error range of ±2.5 μm for traveling 15 mm. With an assumption that the moving path 11 is 300 mm, the allowable error would be ±50 μm. In the instant embodiment, with a standard C7 grade screw being taken as an example, the drive unit allowable error for the moving object 3 to move a distance of 300 mm is ±50 μm and the detection units 4 are installed by constant interval of a spacing distance of 60 mm. Thus, for each of the detection unit 4, the allowable error is ±10 μm. To realize a control of not exceeding such an allowable error, the absolute value of the comparison data must be less than the absolute value of actual position ±10 μm and actual position ±9 μm in taken in the instant embodiment. The precision measurement is made with an optic scale. As such, when the drive unit 2 drives the screw 12 to rotate, the moving object 3 is simultaneously driven to move. Further, the base 1 is provided thereon with a pair of rails 13 that guide the movement of the moving object 3. The moving path 11 can be linear, curved, or a combination of linear sections and curved sections.

The detection units 4 are installed in a line along the moving path 11 of the base. As shown in the drawings, the detection units 4 are mounted on a surface of the base 1 that is located under the screw 12 (see the top plan view of the base 1 shown in FIGS. 2 and 3). The moving object 3 has an undersurface that opposes the surface of the base 1 and is provided with an operation section 31 detectable by the detection units 4. As such, the detection units 4 may detect the movement of the moving object 3 along the moving path 11 and generates an instantaneous signal. The detection units 4 can be optoelectric detection units or magnetic detection units that may serve as the detection units 4 for detection of position. Taking optoelectric detection units as an example, when the operation section 31 of the moving object 3 (see FIG. 3) shields the optoelectric detection units, the optoelectric detection units will generate a detection signal that is transmitted to the controller 5 to complete the detection operation carried out by the detection units 4.

The controller 5 has the position data of each of the detection units 4 on the moving path 11. The controller is electrically connected (such as connection through electrical means or electromagnetic means embodied with fiber optic) to the drive unit 2 and the detection units 4. The controller 5 performs computation operations based on these position data and the drive unit allowable error to obtain multiple sets of comparison data. Further, the controller 5 receives the instantaneous signal to generate instantaneous position data. The controller 5 compares the instantaneous position data with the corresponding comparison data to determine if it is to take a correction operation. When the controller 5 determines the instantaneous position data does not exceed the comparison data, no correction is needed and the moving object 3 continues moving; when the controller 5 determines the instantaneous position data exceeds the comparison data, error correction is carried out. One way of error correction is that when the controller 5 determines the instantaneous position data exceeds the comparison data, an instantaneous correction is made of the instantaneous position data to not exceed the comparison data. Another way of error correction is that when the controller 5 determines the instantaneous position data exceeds the comparison data, acceleration or deceleration is made on the drive unit 2 in order to effect a control such that when the moving object 3 reaches the next detection unit 4, the instantaneous position data is made not exceeding the comparison data.

As such, once the instantaneous position data detected at each time when the moving object 3 passes the detection units 4 is different from the comparison data, the controller 5 may instantaneously determines if a correction is needed, so that the error of the instantaneous position data displayed on the controller 5 is always controlled within an allowable range. Thus, no matter how long the distance that the moving object 3 travels is, instantaneous correction of errors in the moving situation can always be realized to prevent accumulation of the errors, provided the detection units 4 are arranged along the moving path 11 to take detections.

Referring to FIG. 4, for a conventional movable device, the moving speed is 3 mm per second. For an operation to be carried out in such a way the acceptable error is ±0.5 mm for a travel of 3 mm, then an instantaneous error may occur unexpectedly to get beyond the acceptable range. On the other hand, referring to FIGS. 2, 3, and 5, the movable device with instantaneous error correction according to the present invention comprise a drive unit 2 that is previously set up with a drive unit allowable error, such as ±0.5 mm allowable error for a distance of movement of 3 mm, and thus, the movement of the moving object 3 of the movable device is under well control to prevent an instantaneously generated large error that exceeds the allowable range.

The features of a movable device allowing instantaneous correction of error and an error correction method thereof according to the present invention are that a plurality of detection units 4 is installed in a line along a moving path 11 and each of the detection units 4 has an actual position that is acquired through precision measurement to thereby provide comparison data. Each time when the moving object 3 passes through the detection units 4, instantaneous position data (that are generated with instantaneous signals) are detected. Once the instantaneous position data are different from the comparison data, the controller 5 instantaneously determines correction is needed, so that the instantaneous position data that the controller 5 is supplied shows an error that is always controlled with an allowable range. Thus, no matter how long the distance that the moving object 3 travels is, instantaneous correction of errors in the moving situation can always be realized to prevent accumulation of the errors, provided the detection units 4 are arranged along the moving path 11 to take detections. In other words, the present invention provides an effect of instantaneous correction of error in a moving situation in order to prevent accumulation of errors and ensuring that the correct position can be reached with one time operation. Thus, there is no need to shut down machine for calibration, the manufacturing efficiency can be effectively improved, and the manufacturing cost can be lowered down. Further, an advantage that no matter how long the distance of movement is, the error is always controlled within the allowable range is provided.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An error correction method for instantaneously correcting error of a moving object which is moving on a moving path located on an moveable device while the moving object is maintained in a moving situation, the movable device comprising the moving object, a base having the moving path on which the moving object moves, a drive unit that drives the moving object, and a controller, wherein the drive unit is configured with a drive unit allowable error, the error correction method comprising:

separately allocating a plurality of detection units along the moving path, each detection unit detects a presence of the moving object, wherein the moving object moving along the moving path is detected by the plurality of detection units in sequence while the moving object is maintained in a moving situation;

precisely measuring a positions of each detection unit of the plurality of detection units thereby obtaining a position data of each detection unit, the position data of each detection unit being supplied to the controller in such a manner, that the controller performs a computing operation to obtain a comparison data of each detection unit according to the position data of each detection unit and the drive unit allowable error, and each detection unit is with one comparison data;

generating an instantaneous signal by one detection unit while said one detection unit detects the presence of the moving object, wherein the instantaneous signal is transmitted to the controller to generate an instantaneous position data of the moving object in relation to said one detection unit;

enabling the controller to compare the instantaneous position data of the moving object corresponding to said one detection unit with the comparison data of said one detection unit; and performing error correction in relation to a movement of the moving object by the drive unit while the moving object is maintained in a moving situation when the controller determines that the instantaneous position data of the moving object corresponding to said one detection unit exceeds the comparison data, or otherwise not performing error correction in relation to a movement of the moving object by the drive unit while the moving object is maintained in a moving situation when the controller determines that the instantaneous position data of the moving object corresponding to said one detection unit does not exceed the comparison data.

2. The error correction method for instantaneously correcting error of a moving object as claimed in claim 1, wherein in the step of control by controller, when the controller determines the instantaneous position data exceed the comparison data, acceleration or deceleration is applied to the drive unit to achieve such a control that when the moving object reaches the next detection unit, the instantaneous position data do not exceed the comparison data.

3. The error correction method for instantaneously correcting error of a moving object as claimed in claim 1, wherein the precision measurement is carried out with an optic scale.

4. The error correction method for instantaneously correcting error of a moving object as claimed in claim 1, wherein the drive unit of the movable device comprises at least one screw to drive the moving object to move, the screw being previously set up with the drive unit allowable error.

5. A movable device for instantaneously correcting error of a moving object, comprising:

a base, which comprises a moving path;

a moving object, which is movably mounted on the moving path of the base;

a drive unit, which drives the moving object to move along the moving path and is previously set up with a drive unit allowable error;

a plurality of detection units, which is separately installed in a line along the moving path, each detection unit detects a presence of the moving object along the moving path, the plurality of detection units detect the moving object moving along the moving path in sequence while the moving object is maintained in a moving situation, and one detection unit generate an instantaneous position signal while said one detection unit detects the presence of the moving object; and a controller, which is electrically connected to the drive unit and the detection units and comprises position data of the detection units on the moving path, the controller performs a computing operation to obtain a comparison data of each detection unit according to the position data of each detection unit and the drive unit allowable error, the instantaneous signal is transmitted to the controller to generate an instantaneous position data of the moving object in relation to said one detection unit, the controller compare the instantaneous position data of the moving object corresponding to said one detection unit with the comparison data of said one detection unit, wherein the drive unit performing error correction in relation to a movement of the moving object while the moving object is maintained in a moving situation when the controller determines that the instantaneous position data of the moving object corresponding to said one detection unit exceeds the comparison data, or otherwise not performing error correction in relation to a movement of the moving object while the moving object is maintained in a moving situation when the controller determines that the instantaneous position data of the moving object corresponding to said one detection unit does not exceed the comparison data.

6. The movable device for instantaneously correcting error of a moving object as claimed in claim 5, wherein the moving path of the base comprises one of a linear segment, a curved segment, and a combination of linear and curved segments.

7. The movable device for instantaneously correcting error of a moving object as claimed in claim 5, wherein the moving path of the base comprises at least one screw, the drive unit driving the screw to rotate, the moving object being movably coupled to the screw with threading engagement, the screw being set up with the drive unit allowable error.

8. The movable device for instantaneously correcting error of a moving object as claimed in claim 5, wherein the controller is connected to the detection units and the drive unit through electrical means.

9. The movable device for instantaneously correcting error of a moving object as claimed in claim 5, wherein the controller is connected to the detection units and the drive unit through electromagnetic means.

* * * * *